United States Patent [19]
Caldwell et al.

[11] 3,785,458
[45] Jan. 15, 1974

[54] LUBRICATION SYSTEM FOR A GEAR DRIVE MECHANISM

[75] Inventors: Samuel I. Caldwell, Aurora; Michael E. Cheek; Lawrence R. Cline, both of Oswego, all of Ill.

[73] Assignee: Caterpillar Tractor Co., Peoria, Ill.

[22] Filed: Apr. 14, 1972

[21] Appl. No.: 244,213

[52] U.S. Cl. .............................. 184/6.12, 184/11 R
[51] Int. Cl. .............................................. F16n 7/26
[58] Field of Search ............. 184/11 R, 11 A, 6.12, 184/13 A, 13 R, 6 R

[56] References Cited
UNITED STATES PATENTS

| | | | |
|---|---|---|---|
| 3,182,527 | 5/1965 | Bryan | 184/11 R |
| 1,220,810 | 3/1917 | Alquist | 184/6.12 |
| 3,380,555 | 4/1968 | Myers et al. | 184/6.12 |
| 3,621,937 | 11/1971 | Edge et al. | 184/6.11 |
| 3,138,222 | 6/1964 | Dames et al. | 184/11 A |

Primary Examiner—Manuel A. Antonakas
Attorney—Paul S. Lempio

[57] ABSTRACT

A lubrication system is adapted for continuously lubricating a loose spline connection, attaching a gear to a shaft, and axially spaced bearings rotatably mounting the gear in a closed housing. The gear rotates to centrifugally discharge lubricating oil therefrom to dynamically lubricate the gear, bearings and spline connection via suitably arranged chambers and interconnected passages.

18 Claims, 2 Drawing Figures

LUBRICATION SYSTEM FOR A GEAR DRIVE MECHANISM

BACKGROUND OF THE INVENTION

Conventional lubrication systems for lubricating the spline connection and support bearings for gear drive mechanisms are normally complex in that they necessarily employ pumps, regulators, critically sized orifices and sophisticated distribution networks. Such systems are costly to manufacture and substantially increase the initial and operating cost of the integrated machine by requiring additional mechanisms and by absorbing a substantial portion of the machine's horsepower output. In addition, failure of a working component or the plugging of a critically arranged orifice in such sophisticated lubrication systems could result in catastrophic damage to the machine. A lubrication system overcoming many such problems is disclosed in U.S. Pat. No. 3,380,555, assigned to the assignee of this application.

SUMMARY AND OBJECTS OF THIS INVENTION

Accordingly, an object of this invention is to provide a non-complex, economical and reliable lubrication system for dynamically and continuously lubricating bearings and/or a loose spline connection, such as those employed in a gear drive mechanism.

Another object of this invention is to provide the lubrication system with collector means for funneling lubricating oil to such bearings and/or spline connection.

Another object of this invention is to provide the lubrication system with dam means for centrifugally maintaining a pool of lubricating oil adjacent to such a spline connection in response to rotation of an annular member attached to a shaft for the spline connection.

Other objects and advantages of this invention will become apparent with reference to the accompanying drawing and following description.

DESCRIPTION OF THE PREFERRED EMBODIMENT

Figure 1:
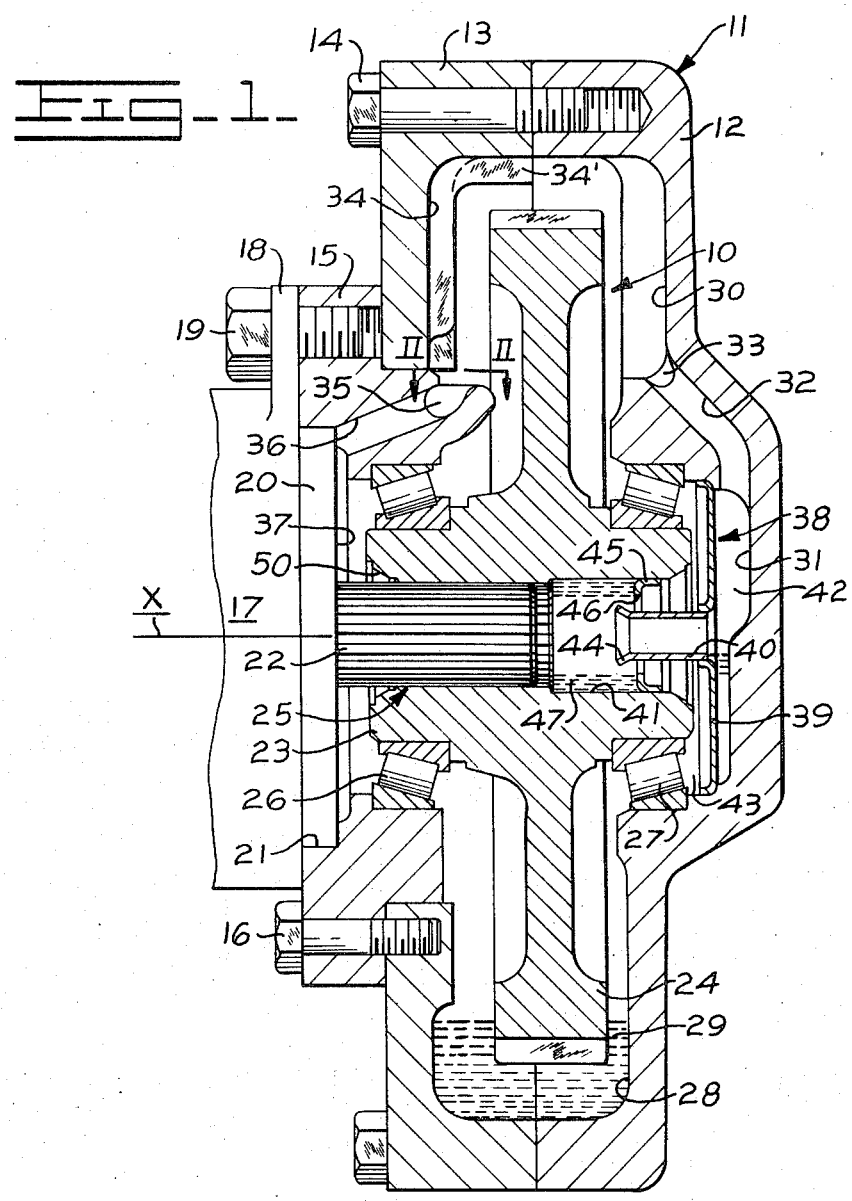
FIG. 1 is a cross sectional view of a gear assembly incorporating a preferred lubrication system embodiment of this invention therein.

Referring to the drawing, a mechanism, such as the illustrated gear assembly 10, is enclosed by a multi-part housing 11 comprising an outer case 12 attached to a cover 13 by circumferentially disposed bolts 14. An annular adapter ring 15 is attached to cover portion 13 by circumferentially disposed bolts 16. The housing of a hydrostatic motor 17 or the like is attached at circumferentially disposed flanges 18 thereof (one shown) to the adapter ring by bolts 19.

The motor's housing comprises a centrally disposed boss 20 snuggly disposed within a mating bore 21 formed in the adapter ring. A power output shaft 22 of the motor extends through the adapter ring and into the housing and into a hub 23 of an annular member, such as the illustrated gear means or spur gear 24, rotationally secured therein by a loose spline connection 25. The spline connection provides a sufficient working tolerance between the shaft and gear to permit the restricted flow of lubricating oil therethrough. The gear is rotatably mounted in adapter ring 15 and case 12 by axially spaced support bearing assemblies 26 and 27, respectively, for rotation about a longitudinal axis X thereof.

The lubrication system of this invention comprises a reservoir 28, defined at the lower end of a closed chamber means defined in the housing, for retaining lubricating oil 29 therein. The chamber means for circulating the oil within the housing to aid in the lubrication of the bearing assemblies and spline connection comprises a cup-shaped primary chamber 30 and an axially and radially displaced cup-shaped secondary chamber 31, both concentrically formed internally on case 12. The secondary chamber is substantially smaller than the primary chamber and is positioned closely adjacent to bearing assembly 27.

Figure 2:
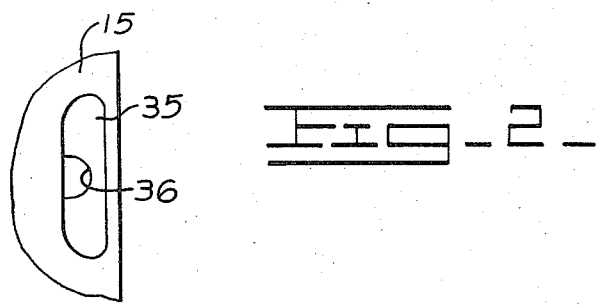
FIG. 2 is a top plan view of a collector means employed in the lubrication system, taken in the direction of arrows II—II in FIG. 1.

The secondary chamber communicates with the primary chamber via a downwardly disposed passage 32, terminating at its inlet at an elongate collector means or channel 33, disposed transversely relative to axis X. The primary chamber in turn communicates with an opposed cup-shaped primary chamber 34 and an elongated substantially vertically disposed rib 34' formed internally on cover 13. Chamber 34 communicates with a circumferentially disposed collector means or channel 35 (FIG. 2), substantially resembling collector channel 33, which forms the inlet to a downwardly disposed passage 36 and an annular secondary chamber 37.

Secondary chamber 31 is partitioned by an annular baffle means or weir assembly 38 comprising an annular washer 39 having an axially disposed conducting means or tube 40 secured centrally therein. The tube extends axially inwardly along axis X and into a bore 41, formed at the axial end of gear hub 23. The radially extending washer thus divides recess 31 into an outwardly disposed collecting section 42 and an inwardly disposed directing section 43.

The tube terminates at a flared end portion 44, within gear bore 41, which is axially opposed to shaft 22. A cup-shaped washer 45 is press-fitted into bore 41 to define an annular, restricted passage 46 around tube 40. The washer functions as a dam means to form an annular reservoir within gear 24 to control the dynamic level of a centrifugally maintained pool of oil 47 in the reservoir in response to rotation of the gear. The dam means further forms passage 46 for communicating a radially inward flow of lubricating oil, exceeding such dynamic level, to bearing 27 through directing section 43.

OPERATION

Upon rotation of gear 24, the lower gear teeth positioned in reservoir 28 will pick up oil 29 and discharge it into the upper portions of radially disposed and axially opposed primary chambers 30 and 34. The oil initially provides a lubricating film on the gear teeth so that as the gear meshes with another gear member (not shown), frictional wear is greatly reduced. The centrifugally discharged oil flows, under the influence of gravity, along the internal wall portions defining the primary chambers and downwardly into collector channels 33 and 35, which are exposed in overlapping relationship with respect to the primary chamber means. The rib 34', vertically disposed in the primary chamber 34, further aids in directing oil downwardly to the collector channel.

Oil deposited in inboard collector channel 35 is funneled into passage 36 and secondary chamber 37. A substantial portion of such oil is deposited on the exposed spline teeth formed on shaft 22. As the shaft rotates, the oil is centrifugally thrown radially outwardly to lubricate bearing 26. The oil passing through the secondary chamber 37 flows through bearing 26, assuring full lubrication thereof, and into reservoir 28 for recycling.

The oil discharged by gear 24 into primary chamber 30 is funneled by collector channel 33 into downwardly extending passage 32 and collection section 42. The volume of oil maintained in the collection section will remain substantially constant with excess oil overflowing into bore 41, through tube 40. Flange 44 aids in preventing an oil backflow along the outer surface of the tube.

The oil deposited in bore 41 is centrifugally thrown against the wall portions defining the bore, as indicated at 47. Thus, full and continuous lubrication of spline connection 25 is assured. Oil 47 moves leftwardly along the spline connection to dynamically lubricate same and is deposited into secondary chamber 37 at a conically-shaped outlet 50. The oil thus separates from shaft 22 and mixes with the oil previously routed thereto from subchamber 37 and passage 36 to aid in the lubrication of bearing 26.

A portion of oil 47 which flows through restricted passage 46 is centrifugally thrown radially outwardly and enters directing section 43. The bearing 27 is thus fully lubricated, with the spent oil flowing into reservoir 28 for recycling purposes.

In view of the foregoing, it is readily apparent that the lubrication system of this invention is adapted to utilize lubricating oil contained in self-contained reservoir 28 to continuously lubricate gear 24, spline connection 25 and bearings 26 and 27, solely in response to gear rotation. While the invention has been described and shown with particular reference to the preferred embodiment, it is apparent that variations might be possible that would fall within the scope of the present invention, which is not intended to be limited except as defined in the following claims.

What is claimed is:

1. A housing defining an oil retaining reservoir therein,
   gear means disposed in said housing and attached to a shaft for rotation about a longitudinal axis thereof,
   bearing means rotatably mounting said gear means and said shaft in said housing, said gear means positioned to have a lower portion thereof positioned in said reservoir,
   lubrication means for lubricating said gear means and said bearing means solely in response to rotation of said gear means, including chamber means for receiving lubricating oil centrifugally discharged by said gear means, passage means communicating with said bearing means and collector means for receiving a substantial portion of the centrifugally discharged oil from said chamber means and for directly funneling such oil to said passage means,
   said chamber means comprising radially disposed axially opposed primary chamber means formed internally on said housing to substantially surround said gear means and a secondary chamber means formed internally on said housing and disposed radially inwardly and axially outwardly relative to a respective one of said primary chamber means and adjacent to said bearing means and wherein one of said collector means is positioned on each axial side of said gear means and exposed in overlapping relationship with respect to each of said primary chamber means for receiving lubricating oil therefrom directly and wherein said passage means comprises a passage communicating each of said collector means with a respective one of said secondary chamber means, each of said collector means and said passages positioned vertically above said axis.

2. The invention of claim 1 wherein said gear means is attached to said shaft by a loose spline connection and wherein said lubrication means further lubricates said spline connection, via said passage means, solely in response to rotation of said gear means.

3. The invention of claim 1 wherein said gear means comprises a spur gear and said bearing means comprises an annular bearing assembly positioned on said spur gear to rotatably mount said spur gear directly on said housing.

4. The invention of claim 1 further comprising baffle means dividing one of said secondary chamber means into separated annular collecting and directing sections, said collecting section communicating directly with one of said passages and conducting means for communicating lubricating oil axially inwardly from said collecting section toward said shaft and to said bearing means.

5. The invention of claim 4 wherein said conducting means comprises a tube extending axially inwardly along said axis and terminating at a flared portion within said gear means.

6. The invention of claim 4 further comprising dam means forming an annular reservoir within said gear means for controlling the dynamic level of lubricating oil in said annular reservoir in response to rotation of said shaft.

7. The invention of claim 6 wherein said dam means further forms an annular, restricted passage about said conducting means for communicating a radially inward flow of lubricating oil, exceeding said dynamic level, to said bearing means through said directing section.

8. The invention of claim 1 wherein said housing comprises
   an outer case and
   a cover attached to said case, and wherein
   said chamber means comprises a cup-shaped primary chamber formed internally on each of said outer cover and said case, said primary chambers axially opposed to each other and defining said reservoir at their lower end portions.

9. The invention of claim 8 wherein said housing further comprises
   an adapter ring attached to said cover, and further comprising
   a motor attached externally on said adapter ring, said shaft operatively connected to said motor to be driven thereby.

10. The invention of claim 9 wherein said bearing means comprises axially spaced bearing assemblies mounting said gear means on said adapter ring and said case, respectively.

11. A gear drive mechanism comprising a housing having a case, a cover attached to said case, and an adapter ring attached to said cover, chamber means formed in said housing comprising a cup-shaped primary chamber formed internally on each of said case and said adapter ring, said primary chambers axially opposed to each other and defining a reservoir at their lower end portions, a motor attached externally on said adapter ring and having an output shaft operatively connected thereto and extending axially inwardly through said adapter ring and into said housing, a gear mounted on said shaft and disposed within said housing, bearing means rotatably mounting said gear in said housing, and lubrication means, including said chamber means, for lubricating said gear and said bearing means solely in response to rotation of said gear.

12. The invention of claim 11 wherein said bearing means comprises axially spaced bearings each mounting said gear means on said adapter ring and said case, respectively.

13. The invention of claim 11 wherein said gear means is attached to said shaft by a loose spline connection and wherein said lubrication means further lubricates said spline connection, via passage means formed in each of said outer cover and said adapter ring, solely in response to rotation of said gear means.

14. In a mechanism having an annular member attached to a shaft by a loose spline connection, a lubrication system comprising dam means forming an annular reservoir within said member, axially adjacent to an end of said spline connection, for controlling the dynamic level of a centrifugally maintained pool of lubricating oil in said annular reservoir in response to rotation of said shaft, means forming a chamber adjacent to said annular reservoir, baffle means comprising an annular washer dividing said chamber into separate annular collecting and directing sections and conducting means comprising an axially extending tube secured to said washer and terminating within said annular member for communicating lubricating oil axially inwardly from said collecting section to said spline connection.

15. The invention of claim 14 wherein said tube terminates at a flared portion within said gear means which is axially opposed to an end of said shaft.

16. The invention of claim 14 wherein said dam means further forms an annular, restricted passage about said conducting means for communicating a radially inward flow of lubricating oil, exceeding said dynamic level, therethrough and into said directing section.

17. A housing defining an oil retaining reservoir therein comprising an outer case, a cover attached to said case and an adapter ring attached to said cover, gear means disposed in said housing and attached to a shaft for rotation about a longitudinal axis thereof, bearing means rotatably mounting said gear means and said shaft in said housing, said gear means positioned to have a lower portion thereof positioned in said reservoir, lubrication means for lubricating said gear means and said bearing means solely in response to rotation of said gear means, including chamber means for receiving lubricating oil centrifugally discharged by said gear means, comprising a cup-shaped primary chamber formed internally on each of said outer cover and said case in axially opposed relationship to each other and defining said reservoir at their lower end portions, passage means communicating with said bearing means and collector means for receiving a substantial portion of the centrifugally discharged oil from said chamber means and for directly funneling such oil to said passage means, and a motor attached externally on said adapter ring, said shaft operatively connected to said motor to be driven thereby.

18. A housing comprising on outer case, a cover attached to said case and an adapter ring attached to said cover to define an oil retaining reservoir therein, annular gear means disposed in said housing to have a lower portion thereof positioned in said reservoir and attached by a loose spline connection to a shaft, extending through said adapter, for rotation about a longitudinal axis thereof, axially spaced first and second bearing means rotatably mounting said shaft and member on said adapter and on said case, respectively, and lubrication means for continuously lubricating said gear means, said spline connection and said first and second bearing means upon rotation of said gear means.

* * * * *